(12) United States Patent
Glime, III et al.

(10) Patent No.: US 11,542,964 B2
(45) Date of Patent: Jan. 3, 2023

(54) ARRANGEMENTS AND METHODS FOR CONTROLLED FLOW RATE OF PNEUMATIC ACTUATED VALVES

(71) Applicant: Swagelok Company, Solon, OH (US)

(72) Inventors: William H. Glime, III, Chagrin Falls, OH (US); Branden W. Keeper, Mentor, OH (US)

(73) Assignee: Swagelok Company, Solon, OH (US)

( * ) Notice: Subject to any disclaimer, the term of this patent is extended or adjusted under 35 U.S.C. 154(b) by 19 days.

(21) Appl. No.: 17/065,784

(22) Filed: Oct. 8, 2020

(65) Prior Publication Data

US 2021/0108738 A1 Apr. 15, 2021

Related U.S. Application Data

(60) Provisional application No. 62/913,769, filed on Oct. 11, 2019.

(51) Int. Cl.
*F16K 31/122* (2006.01)
*F16K 47/00* (2006.01)
*F15B 15/22* (2006.01)

(52) U.S. Cl.
CPC ........ *F15B 15/226* (2013.01); *F16K 31/1221* (2013.01); *F16K 31/1225* (2013.01); *F16K 47/00* (2013.01)

(58) Field of Classification Search
CPC ............. F16K 31/1221; F16K 31/1225; F16K 31/1226; F16K 47/00; F16K 47/01;
(Continued)

(56) References Cited

U.S. PATENT DOCUMENTS 3,845,932 A * 11/1974 Fontaine ............... B60T 7/16
251/63.4
3,889,922 A * 6/1975 Peters ............... F16K 31/143
137/553

(Continued)

FOREIGN PATENT DOCUMENTS

CN 108050123 5/2018
EP 2564098 3/2013
FR 2819027 7/2002

OTHER PUBLICATIONS

International Search Report and Written Opinion from PCT/US2020/054886 dated Jan. 25, 2021.

*Primary Examiner* — Kevin F Murphy
*Assistant Examiner* — Jonathan J. Waddy
(74) *Attorney, Agent, or Firm* — Calfee, Halter & Griswold LLP (57) ABSTRACT

An actuator includes a housing defining an inlet port, a piston and a return spring disposed within the housing, and an elastically deformable element. The return spring is configured to apply a biasing force to the piston to move the piston to a spring return position. A first fluid pressure applied to the inlet port moves the piston against the biasing force of the return spring to a first actuated position in which the piston indirectly engages a stop portion of the actuator housing. A second fluid pressure, greater than the first fluid pressure, applied to the inlet port moves the piston against the elastically deformable element to compress the elastically deformable element to move the piston to a second actuated position beyond the first actuated position.

23 Claims, 4 Drawing Sheets

(58) Field of Classification Search
CPC .. F16K 47/012; F16B 15/1409; F16B 15/148; F16B 15/225; F16B 15/226; G05D 16/10; F15B 15/1409; F15B 15/148; F15B 15/225; F15B 15/226; F15B 13/0407
USPC .................. 251/337, 63.4, 63.5, 63.6, 64
See application file for complete search history.

(56) References Cited

U.S. PATENT DOCUMENTS

| | | | | |
|---|---|---|---|---|
| 4,054,156 A * | 10/1977 | Benson | ................ | F02D 9/06 137/630.12 |
| 4,408,627 A * | 10/1983 | Harris | ................ | F02D 9/06 123/323 |
| 4,794,890 A * | 1/1989 | Richeson, Jr. | ............ | F01L 9/20 123/90.11 |
| 4,831,973 A * | 5/1989 | Richeson, Jr. | ............ | F01L 9/20 123/90.11 |
| 4,903,939 A * | 2/1990 | Ariizumi | ............ | F16K 31/1221 251/63.4 |
| 5,779,224 A * | 7/1998 | Fukano | ................ | F16K 41/12 251/331 |
| 6,367,769 B1 * | 4/2002 | Reiter | ................ | F02M 51/0671 239/585.5 |
| 7,340,939 B2 * | 3/2008 | Jansen | ................ | F16K 1/38 137/606 |
| 7,862,002 B2 * | 1/2011 | Naitoh | ................ | F16K 51/02 251/63.6 |
| 2006/0175563 A1 * | 8/2006 | Tsubota | ............ | F16K 31/1221 251/25 |
| 2007/0007475 A1 * | 1/2007 | Zvokelj | ................ | F16K 39/024 251/63.6 |
| 2007/0290154 A1 * | 12/2007 | Aoyama | ............ | F16K 31/1226 251/63 |
| 2008/0054205 A1 * | 3/2008 | Lou | ................ | F01L 1/462 251/63.6 |
| 2010/0138051 A1 | 6/2010 | Glime | | |
| 2012/0119129 A1 * | 5/2012 | Sakai | ................ | F16K 7/17 251/321 |
| 2013/0037146 A1 * | 2/2013 | Anagnos | ................ | F16K 39/024 137/614.16 |
| 2014/0103240 A1 | 4/2014 | Glime, III | | |
| 2014/0197345 A1 * | 7/2014 | Graichen | ............ | F16K 31/084 251/324 |
| 2016/0230906 A1 * | 8/2016 | Tanikawa | ............ | G05D 16/0619 |
| 2017/0292626 A1 * | 10/2017 | Zhang | ................ | F16K 31/1221 |
| 2019/0226937 A1 | 7/2019 | Glime, III | | |

* cited by examiner

ARRANGEMENTS AND METHODS FOR CONTROLLED FLOW RATE OF PNEUMATIC ACTUATED VALVES

CROSS-REFERENCE TO RELATED APPLICATION

This application claims priority to and all benefit of U.S. Provisional Patent Application Ser. No. 62/913,769, filed on Oct. 11, 2019 and entitled ARRANGEMENTS AND METHODS FOR CONTROLLED FLOW RATE OF PNEUMATIC ACTUATED VALVES, the entire disclosure of which is incorporated herein by reference.

BACKGROUND

Actuators are often used to control the operation of valves and other fluid system components. An actuator may be of any number of different designs including pneumatic, hydraulic, electric and so on. Fluid driven actuators use pressurized fluid, such as air, to move one or more fluid driven actuator members (e.g., pistons, diaphragms, bellows, etc.) in order to move a valve element (e.g., a rotary valve stem, plug, diaphragm, and/or bellows) for control (e.g., shutoff, metering, directional control) of system fluid passing through the valve.

A conventional actuated valve assembly uses a spring biased pneumatic actuator for two-position operation of the valve between an actuated position, in response to pressurization of the actuator inlet port to overcome the biasing spring and move the actuator piston and connected valve member, and a normal or return position, in response to venting of the actuator inlet pressure and spring movement of the actuator piston and valve member.

Valve component dimensional tolerances, valve seat wear and/or deformation, and other such conditions may result in variations in valve flow capacity in the open condition, for example, in one valve over time, or between valves (e.g., installed in parallel) within a system. The resulting flow deviations may result in inconsistent and/or undesirable conditions.

SUMMARY

In an exemplary embodiment of the present disclosure, an actuator includes a housing defining an inlet port, a piston and a return spring disposed within the housing, and an elastically deformable element. The return spring is configured to apply a biasing force to the piston to move the piston to a spring return position. A first fluid pressure applied to the inlet port moves the piston against the biasing force of the return spring to a first actuated position in which the piston indirectly engages a stop portion of the actuator housing. A second fluid pressure, greater than the first fluid pressure, applied to the inlet port moves the piston against the elastically deformable element to compress the elastically deformable element to move the piston to a second actuated position beyond the first actuated position.

DETAILED DESCRIPTION OF EXEMPLARY EMBODIMENTS

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The present disclosure contemplates arrangements and methods for varying the flow capacity through an actuated shutoff valve, for example, to establish uniformity of flow in multiple valves in a system, or to correct for changes in flow capacity over time (e.g., due to valve seat wear or deformation), or to provide a degree of flow control capability when used in conjunction with process or positional feedback.

For a conventional pneumatic or fluid driven linear actuator, a pressurized fluid is applied to the actuator, through an inlet port, to pressurize one or more fluid driven pistons for axial movement of the piston(s) to an actuated position, for example, to provide for linear movement of a valve element (e.g., diaphragm, stem tip) in a valve with which the actuator is assembled. The actuating fluid pressure applied to the actuator is sufficient to overcome multiple resistive forces within the actuator and/or valve, including, for example, actuator spring forces (e.g., for a "normally closed" spring biased actuator), friction between the piston(s) and the actuator housing, and/or resistive forces of the valve element.

Figure 1A:
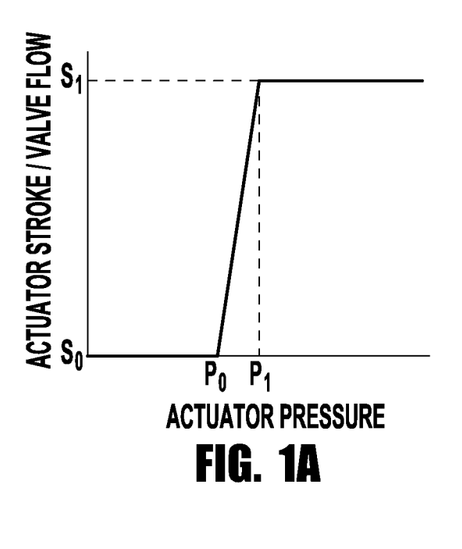
FIG. 1A illustrates an actuator stroke-pressure curve for a conventional spring loaded pneumatic actuator.

Conventional spring loaded (e.g., "normally closed") pneumatic actuators are generally considered to be two-position actuators having a first, unpressurized or "normal" position (e.g., closed) and a second, pressurized or "actuated" position (e.g., open). While variations in actuator pressure, below the pneumatic pressure required to fully actuate the actuator and valve, may provide for partial actuation of the actuator piston(s) and valve element, variations in spring rate of the return spring and friction resistance of the piston(s) and other actuator/valve components make it difficult to accurately and predictably control partial actuation of the actuator through variation of the applied actuator pressure. FIG. 1A illustrates an actuator stroke-pressure curve for a conventional spring loaded pneumatic actuator, in which actuator pressure driven actuation between the spring return position $s_1$ and the fully actuated position $s_2$ (e.g., engagement of the actuator piston with a mechanical stop) takes place over a narrow pressure range between a first pressure $p_1$ required to begin the actuation stroke and a second pressure $p_2$ required for full actuation.

Figure 1B:
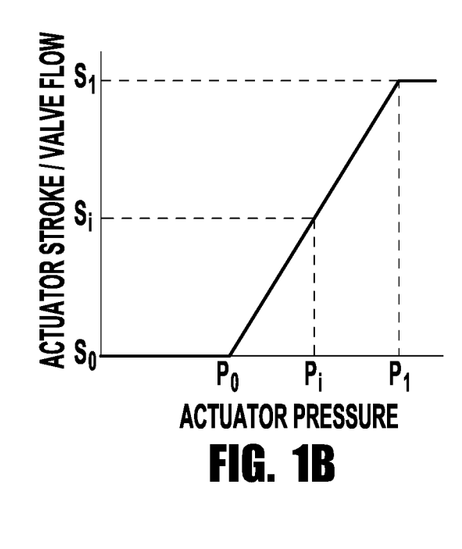
FIG. 1B illustrates an actuator stroke-pressure curve for an exemplary pneumatic actuator provided with a return spring having an increased spring rate.

In one embodiment, a spring return actuator may be provided with a biasing spring arrangement having an increased spring rate (e.g., by providing a stiffer spring and/or additional springs, in parallel and/or in series) such that one or more partial flow positions may more predictably correspond with one or more predetermined applied actuator inlet pressures. As one example, the spring return actuator may be provided with a spring rate that is greater than about five times the spring force in the closed position, as compared to a conventional valve actuator spring rate of less than three times the spring force in the closed position. This increased spring rate may provide significant, measurable, and predictable differences in actuator pressure required to move the actuator piston and valve element to one or more incremental positions between the normal position and the actuated (e.g., open) position of the valve. One such arrangement is described in co-owned US Patent Application Pub. No. 2019/0226937, entitled "SYSTEMS AND METHODS FOR CONTROL AND MONITORING OF ACTUATED VALVES" (the "'937 Application"), the entire disclosure of which is incorporated herein by references. FIG. 1B illustrates an actuator stroke-pressure curve for an exemplary pneumatic actuator provided with a return spring having an increased spring rate, in which actuator pressure driven actuation between the spring return position $s_1$ and the fully actuated position $s_2$ (e.g., engagement of the actuator piston with a mechanical stop) takes place over a wider and more predictable pressure range between a first pressure $p_1$ required to begin the actuation stroke and a second pressure $p_2$ required for full actuation, such that a desired partial actuator stroke $s_i$ may be effected by applying a corresponding actuator pressure $p_i$ between the first and second pressures $p_1$, $p_2$.

Figure 1C:
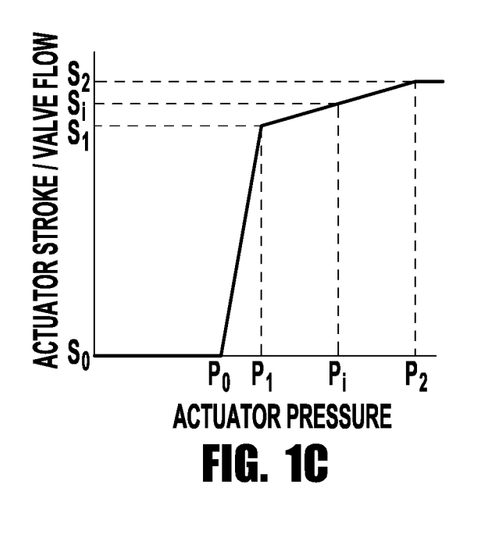
FIG. 1C illustrates an actuator stroke-pressure curve for an exemplary "normally closed" pneumatic actuator provided with an elastically deformable element providing for adjustable flow capacity.

According to an exemplary aspect of the present disclosure, a pneumatic actuator may be provided with an elastically deformable (e.g., elastically compressible) element (e.g., one or more coil springs, gaskets, and/or Belleville spring washers, or elastically deformable tabs, flanges or other structure) provided with a spring rate or compressive strength that is sufficient to resist or prevent deformation of the element when a first pneumatic operating pressure is applied to the actuator to move the fluid driven piston to a first actuated position (e.g., against a spring bias force of a return spring in the actuator), for corresponding movement of the valve element (e.g., diaphragm, stem tip) to a first open position having a first flow capacity. When the pneumatic pressure applied to the actuator is increased beyond the first pneumatic operating pressure, the elastically deformable element is axially and elastically deformed to permit further axial travel of the piston (and with it, the valve element) to a second actuated position to provide an increased or second open position having a flow capacity greater than the first flow capacity. The significant predetermined spring rate or compressive strength of the elastically deformable element also provides for predictable axial travel of the piston beyond the first actuated position based on the applied actuator pressure. FIG. 1C illustrates an actuator stroke-pressure curve for an exemplary "normally closed" pneumatic actuator provided with an elastically deformable element providing for adjustable flow capacity in which actuator pressure driven actuation between the spring return position s1 and a first actuated position s2 (e.g., engagement of the actuator piston with a mechanical stop) is effected by application of a first actuation pressure takes place over a narrow pressure range between a first pressure p1 required to begin the actuation stroke and a second pressure p2 required for full actuation.

Figures 2, 3:
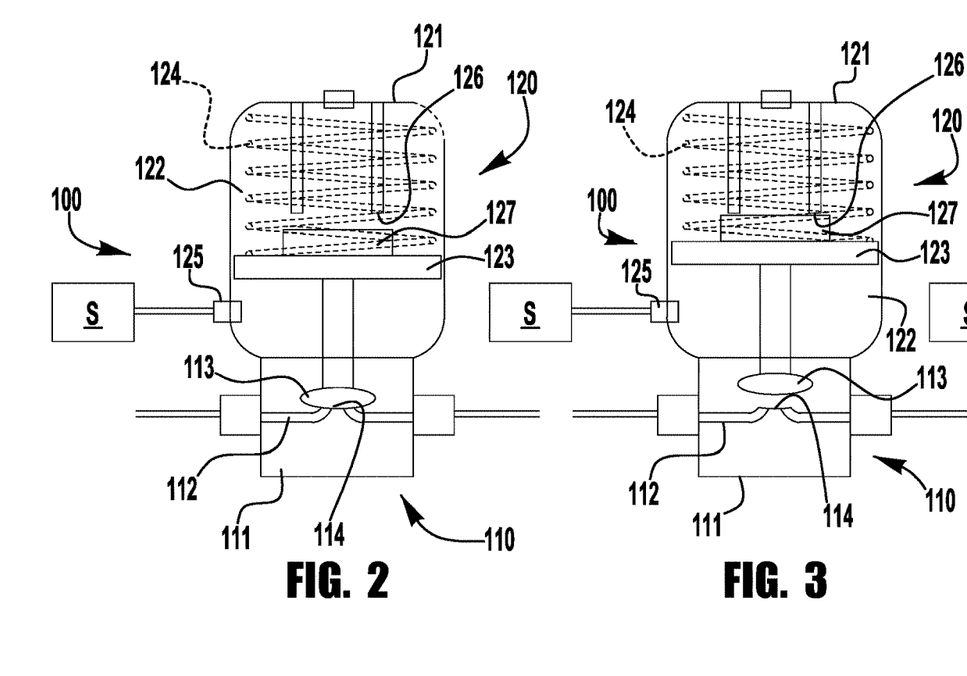
FIG. 2 is schematic view of an actuated valve assembly according to an exemplary embodiment of the present disclosure, shown in a spring return position.
FIG. 3 is a schematic view of the actuated valve assembly of FIG. 2, shown in a first actuated position.
Figure 4:
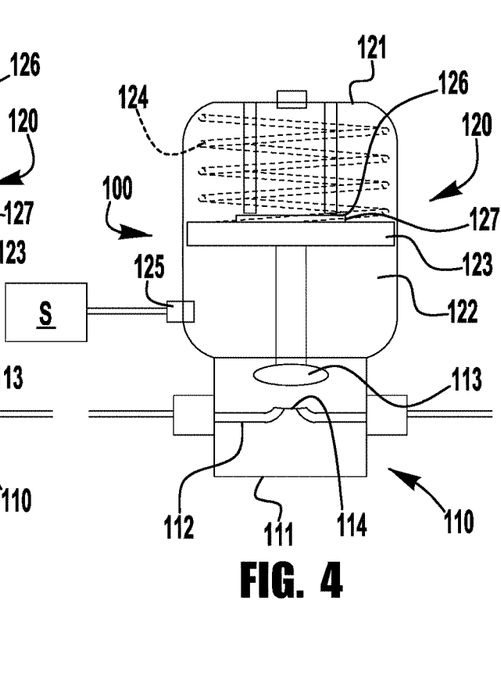
FIG. 4 is a schematic view of the actuated valve assembly of FIG. 2, shown in a second actuated position.

In some embodiments, the elastically deformable element may be axially disposed between a fluid driven piston and an axially fixed stop portion of the actuator. FIGS. 2-4 schematically illustrates an actuated valve assembly 100 including an actuator 120 assembled with a valve 110. The valve 110 includes a valve body 111 defining a flow path 112 and a valve element 113 axially movable with respect to a valve seat 114 between spring return (e.g., valve closed) and first actuated (e.g., open) positions to selectively control (e.g., block or permit) fluid flow through the valve flow path 112. The actuator 120 includes a housing 121 defining a cavity 122 receiving a fluid driven piston 123 operatively connected with the valve element 113 for movement of the valve element between first (e.g., closed) and second (e.g., open) positions. A return spring 124 (or other such biasing member) within the actuator cavity 122 biases the piston 123 (and with it, the valve element 113) towards the spring return position (FIG. 2) when the actuator is unpressurized (or underpressurized). When a first operating fluid pressure is applied (e.g., from a source of pressurized fluid S) to the actuator 120 (at inlet port 125), the fluid driven piston 123 is moved, against the return spring 124, to a first actuated position (FIG. 3), as limited by a stop portion 126 of the actuator, for corresponding movement of the valve element 113 to a first open position having a first flow capacity.

An elastically deformable element, schematically represented at 127, is axially disposed within the actuator cavity 122 between the piston 123 and the actuator stop portion 126. When the pressure applied to the actuator inlet port 125 is increased beyond a base operating pressure, the elastically deformable element 127 is axially compressed to permit further axial travel of the piston (and with it, the valve element) to provide a second actuated (e.g., increased open) position, for example, having a flow capacity greater than the first flow capacity (FIG. 4).

In other exemplary embodiments, the elastically deformable element may additionally or alternatively be integral with the piston (e.g., an elastically deformable web of the piston 123 or an elastically compressible shaft/stem of the piston) and/or integral with the actuator stop (e.g., an elastically deformable tab or flange of the actuator stop 126).

The elastically deformable element 127 may have a spring rate or compressive strength that is sufficient to resist or substantially prevent compression of the element when the first or base operating pressure is applied to the actuator to move the fluid driven piston to the first actuated position. In one such embodiment, the elastically deformable element 127 may have a spring rate that is significantly greater than (e.g., at least 5 times, at least 10 times, at least 20 times, at least 50 times, up to 100 times, or between about 10 times and about 100 times) the spring rate of the return spring 124, such that the element 127 does not begin to measurably compress until an actuator pressure greater than the base operating pressure is applied. In one exemplary embodiment, the actuator return spring may have a spring rate of about 200 lbs/in, and the elastically deformable element may have an effective spring rate of about 10,000 lbs/in. In one such arrangement, the return spring 124 may provide for a base actuation (e.g., corresponding to a minimum desirable flow capacity) at a first fluid pressure (e.g., about 40 psig), while the elastically deformable element 127 may provide for further actuation, between the base actuation and a maximum actuation, at actuation pressures between the first fluid pressure and a second fluid pressure (e.g., about 80 psig, or up to about two times the first fluid pressure). While the elastically deformable element 127 may provide for differing amounts of flow capacity adjustment, in one embodiment, movement of the piston from the spring return position to the first actuated position comprises axial movement of the piston of a first distance, and movement of the piston from the first actuated position to the second actuated position comprises axial movement of the piston of a second distance less than about 20% of the first distance, such that flow capacity adjustment between the first open position and a second open or maximum flow position is limited to a small fraction (e.g., less than 10%) of the total maximum flow capacity (e.g., a base actuated Cv of about 0.59 and a maximum actuated Cv of about 0.64). In other embodiments, the second distance may be greater than the first distance (e.g., greater than about five times the first distance, or greater than about 20 times the first distance), such that the valve flow rate may be adjusted to a selected flow rate across a majority, or nearly an entirety, or an entirety of the flow rate range between closed and fully open positions.

The relatively high spring rate of the elastically deformable element 127, resulting in a spring rate that is substantially constant between the first and second actuated positions of the piston may allow for precise control of the flow capacity over a relatively small flow capacity range, with incremental increases in fluid pressure between the first fluid pressure and the second fluid pressure causing proportional incremental movement of the piston between the first actuated position and the second actuated position.

In use, flow capacity may be remotely and/or automatically adjusted by adjusting the fluid pressure to the actuator for controlled compression of the elastically deformable element. Many different devices and arrangements may be used to control or adjust fluid pressure to the actuator, including, for example, conventional pressure regulators. The above incorporated '937 Application describes a pilot valve arrangement that may be used to adjust actuator inlet pressure by controlling pulsed operation of pressurized fluid supply and venting valves.

Figure 5:
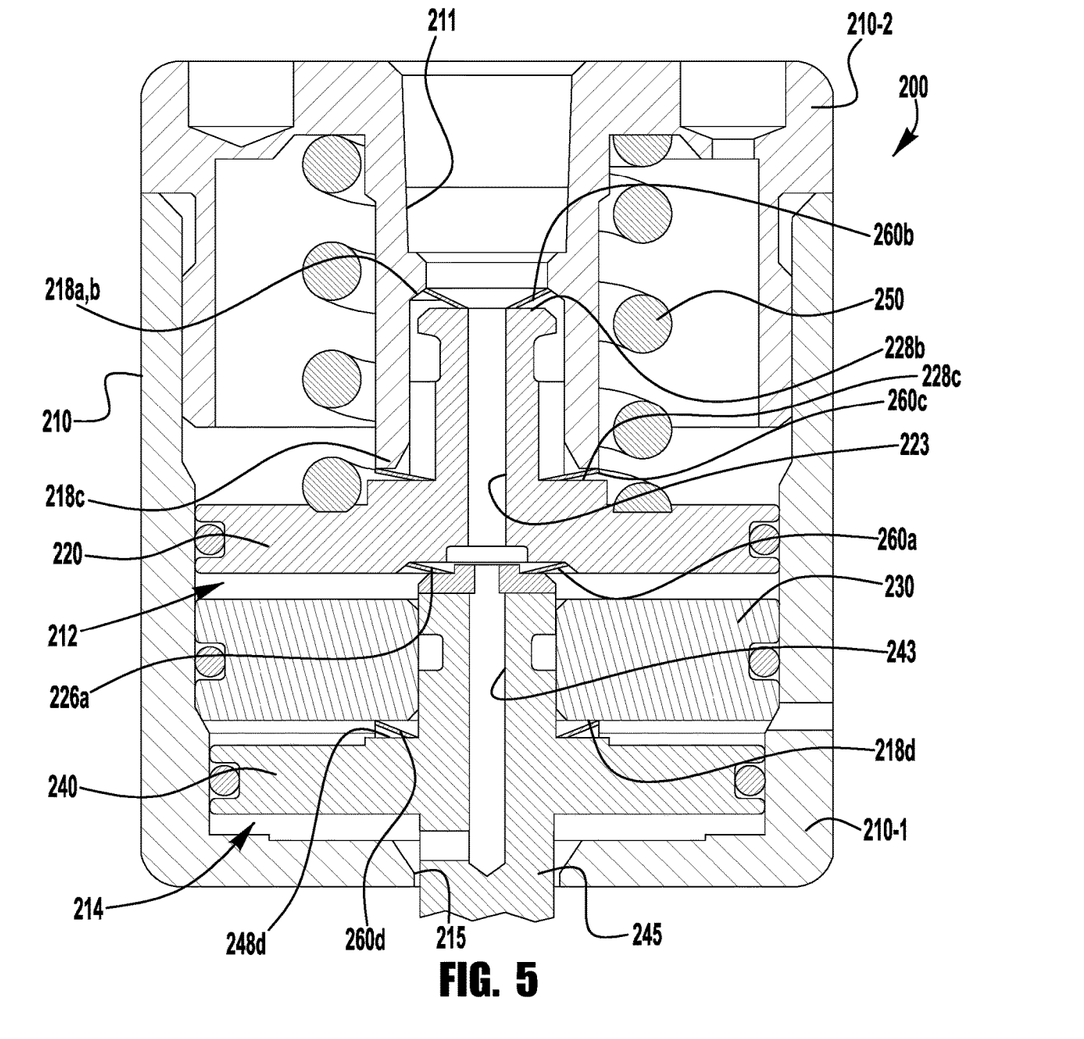
FIG. 5 is a side cross-sectional view of a pneumatic actuator including an elastically deformable element for pressure dependent flow adjustment, according to an exemplary embodiment of the present disclosure.

FIG. 5 illustrates an exemplary actuator 200 adapted to include one or more elastically deformable elements configured to provide adjustable flow capacity in response to adjustment of the actuator inlet pressure. The actuator assembly 200 includes a housing 210 defining an inlet port 211 and first and second piston chambers 212, 214 (e.g., separated by a partition plate 230) receiving first and second force transmitting pistons 220, 240. The second piston 240 is integrated with an output shaft 245 that extends through an output port 215 in the actuator housing 210, for applying an output force to a valve element in a valve (not shown) with which the actuator 200 is assembled. The first piston chamber 212 also retains a biasing spring 250 that engages the first piston 220 to force the first and second pistons 220, 240 downward. To operate the actuator 200, pressurized actuator fluid (e.g., air) applied to the inlet port 211 passes through passages 223, 243 in the first and second pistons 220, 240 to pressurize lower portions of the piston chambers 212, 214, forcing the pistons upward against the biasing spring 250 to move the output shaft 245 upward and one of the first and second piston 220, 240 into direct or indirect engagement with a stop portion of the actuator housing 210 (as described in greater detail below).

As shown in FIG. 5, an elastically deformable element may be provided in a variety of locations between the second piston 240 and the stop portion. As one example, one or more Belleville spring washers 260a (or other such elastically deformable element(s)) may be provided between the upper, first piston 220 and the lower, second piston 240 (e.g., in a lower counterbore 226a in the first piston 220). In such an arrangement, the washer 260a travels with the first and second pistons 220, 240 during actuation to the first actuated position, without being compressed. At the first actuated position, when the first piston 220 engages or contacts the actuator stop portion 218a, additional fluid pressure applied to the actuator, beyond that required to hold the pistons against the return spring forces, compresses the Belleville spring washer 260a to axially advance the second piston 240 and output shaft 245 with respect to the first piston 220 and stop portion 218a, allowing the valve element to move further away from the valve seat (not shown) to increase the flow capacity through the valve.

As another example, one or more Belleville spring washers (or other such elastically deformable element(s)) may additionally or alternatively be provided between the upper, first piston 220 and the actuator stop portion 218. In one such exemplary arrangement, a Belleville spring washer 260b may be positioned between an engagement portion 228b on an upper stem 222 of the first piston 220 and an inner peripheral rib stop portion 218b within the actuator inlet port 211. In another exemplary arrangement, a Belleville spring washer 260c may additionally or alternatively be positioned between an engagement portion 228c on an upper shoulder portion 224 of the first piston 220 and an end face stop portion 218c of the actuator inlet port 211. In such arrangements, the engagement portion 228b, 228c of the first piston 220 indirectly engages the actuator stop portion 218b, 218c when the first and second pistons 220, 240 are actuated to the first actuated position. Additional fluid pressure applied to the actuator, beyond that required to hold the pistons against the return spring forces, compresses the Belleville spring washer 260b, 260c to axially advance the pistons 220, 240 and output shaft 245 with respect to the stop portion 218b, 218c, allowing the valve element to move further away from the valve seat (not shown) to increase the flow capacity through the valve.

As another example, one or more Belleville spring washers (or other such elastically deformable element(s)) may additionally or alternatively be provided between the lower, second piston 240 and an actuator stop portion 218d defined by the partition plate 230. In such an arrangement, an engagement portion 248d on an upper shoulder portion 244 of the second piston 240 indirectly engages the actuator stop portion 218d when the first and second pistons 220, 240 are actuated to the first actuated position. Additional fluid pressure applied to the actuator, beyond that required to hold the pistons against the return spring forces, compresses the Belleville spring washer 260d to axially advance the pistons 220, 240 and output shaft 245 with respect to the stop portion 218d, allowing the valve element to move further away from the valve seat (not shown) to increase the flow capacity through the valve.

Figure 6:
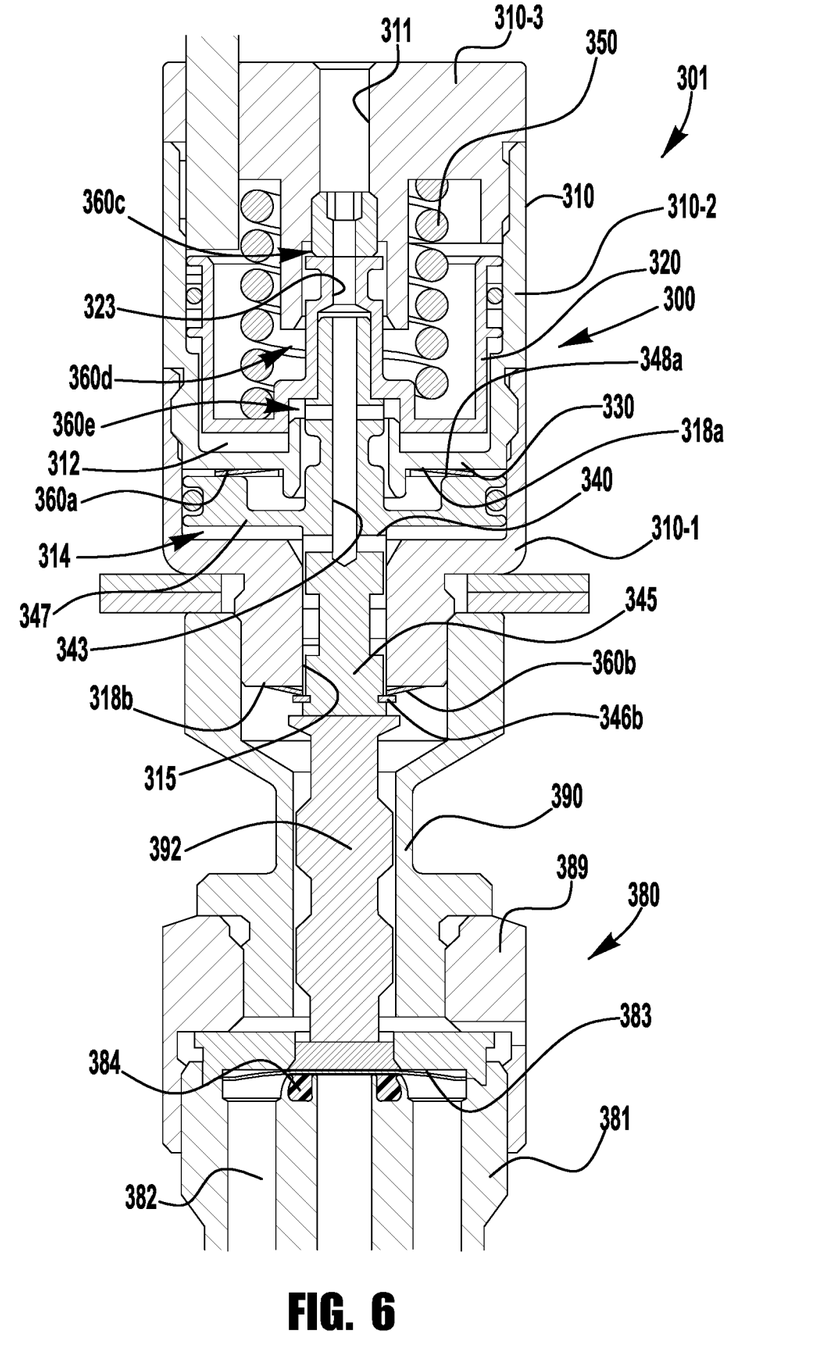
FIG. 6 is a side cross-sectional view of an actuated valve assembly with another pneumatic actuator including an elastically deformable element for pressure dependent flow adjustment, according to an exemplary embodiment of the present disclosure.

FIG. 6 illustrates an exemplary actuated valve assembly 301 including an actuator 300 assembled with a valve 380, with the actuator adapted to include one or more elastically deformable elements configured to provide adjustable flow capacity in response to adjustment of the actuator inlet pressure. The valve 380 includes a valve body 381 defining a flow path 382 and a valve element 383 (e.g., diaphragm) secured in the valve body by a threaded bonnet nut 389 and axially movable with respect to a valve seat 384 between closed and open positions to selectively control (e.g., block or permit) fluid flow through the valve flow path 382. The actuator 300 includes a housing 310 (e.g., threadably assembled first, second, and third housing members 310-1, 310-2, 310-2) defining an inlet port 311 and first and second piston chambers 312, 314 (e.g., separated by a partition plate 330, which may be defined by the second housing member 310-2 as shown) receiving first and second force transmitting pistons 320, 340. The second piston 340 is integrated with an output shaft 345 that extends through an output port 315 in the actuator housing 310, for applying an output force to the valve element 383 in the valve 380. As shown in the illustrated embodiment, the actuator 300 may be spaced apart from the valve 380 (e.g., to insulate the actuator from extreme system fluid temperatures) by a bonnet extension 390 assembled between the actuator outlet port 315 and the valve bonnet nut 389 and a force transmitting shaft 392 disposed between the output shaft 345 and the diaphragm 383. In other embodiments (not shown), the actuator outlet port may be assembled directly to the valve (e.g., threaded to the bonnet nut).

The first piston chamber 312 also retains a biasing spring 350 that engages the first piston 320 to force the first and second pistons 320, 340 downward. To operate the actuator 300, pressurized actuator fluid (e.g., air) applied to the inlet port 311 passes through passages 323, 343 in the first and second pistons 320, 340 to pressurize lower portions of the piston chambers 312, 314, forcing the pistons upward against the biasing spring 350 to move the output shaft 345 upward and one of the first and second pistons 320, 340 into direct or indirect engagement with a stop portion of the actuator housing 310 (as described in greater detail below).

As shown in FIG. 6, an elastically deformable element may be provided in a variety of locations between one of the pistons 320, 340 and a stop portion of the actuator housing. As one example, one or more Belleville spring washers 360a (or other such elastically deformable element(s)) may be provided between the lower, second piston 340 and an actuator stop portion 318a defined by the partition plate 330. In such an arrangement, an engagement portion 348a on an outer radial disk portion 347 of the second piston 340 indirectly engages the actuator stop portion 318a through the elastically deformable element 360a when the first and second pistons 320, 340 are actuated to the first actuated position. Additional fluid pressure applied to the actuator inlet port 311, beyond that required to hold the pistons against the return spring forces, compresses the elastically deformable element 360a to axially advance the pistons 320, 340 and output shaft 345 with respect to the stop portion 318a, allowing the valve element 383 to move further away from the valve seat 384 to increase the flow capacity through the valve 380.

As another example, one or more Belleville spring washers 360b (or other such elastically deformable element(s)) may be provided between the output shaft 345 (e.g., engaging a retaining ring 346b assembled with the output shaft) and an actuator stop portion 318b defined by the actuator output port 315 (e.g., an end face of the actuator output port). In such an arrangement, an engagement portion 346b on the output shaft 345 indirectly engages the actuator stop portion 318b through the elastically deformable element 360b when the first and second pistons 320, 340 are actuated to the first actuated position. Additional fluid pressure applied to the actuator inlet port 311, beyond that required to hold the pistons 320, 340 against the return spring forces, compresses the elastically deformable element 360b to axially advance the pistons 320, 340 and output shaft 345 with respect to the stop portion 318b, allowing the valve element 383 to move further away from the valve seat 384 to increase the flow capacity through the valve 380.

In other embodiments, other elastically deformable element arrangements may additionally or alternatively be used. For example, similar to examples shown in FIG. 5 and described above, one or more elastically deformable elements may be provided between the upper piston stem portion and an actuator inlet port stop portion (e.g., at location 360c in FIG. 6), between the upper piston disk portion 327 and the actuator inlet port end face (at location 360d), or between the upper piston 320 and the lower piston (at location 360e).

In still other exemplary embodiments, the elastically deformable element may additionally or alternatively be integral with the piston (e.g., an elastically deformable web of the piston(s) or an elastically compressible shaft/stem of the piston) and/or integral with the actuator stop (e.g., an elastically deformable tab or flange of the actuator stop).

Although the invention has been disclosed and described with respect to certain exemplary embodiments, certain variations and modifications may occur to those skilled in the art upon reading this specification. Any such variations and modifications are within the purview of the invention notwithstanding the defining limitations of the accompanying claims and equivalents thereof. Accordingly, departures may be made from such details without departing from the spirit or scope of the applicant's general inventive concept.

We claim:

1. An actuator comprising:
a housing defining an inlet port;
a piston disposed within the housing;
a return spring disposed within the housing and configured to apply a first biasing force to the piston to move the piston toward a spring return position; and
an elastically deformable element;
wherein a first fluid pressure applied to the inlet port moves the piston against the first biasing force of the return spring to a first actuated position in which the piston indirectly engages a stop portion of the housing through at least the elastically deformable element; and
wherein a second fluid pressure, greater than the first fluid pressure, applied to the inlet port moves the piston against a second biasing force of the elastically deformable element to compress the elastically deformable element and to move the piston to a second actuated position beyond the first actuated position;
wherein the piston comprises a stem portion extending into the inlet port of the housing, and a disk portion extending radially outward from the stem portion; and
wherein the stop portion is defined by an internal surface of the actuator inlet port, and the elastically deformable element is disposed between the internal surface of the inlet port and an end portion of the stem portion.

2. An actuator comprising:
a housing defining an inlet port;
a piston disposed within the housing;
a return spring disposed within the housing and configured to apply a first biasing force to the piston to move the piston toward a spring return position; and
an elastically deformable element;
wherein a first fluid pressure applied to the inlet port moves the piston against the first biasing force of the return spring to a first actuated position in which the piston indirectly engages a stop portion of the housing through at least the elastically deformable element; and
wherein a second fluid pressure, greater than the first fluid pressure, applied to the inlet port moves the piston against a second biasing force of the elastically deformable element to compress the elastically deformable element and to move the piston to a second actuated position beyond the first actuated position;
wherein the piston comprises a stem portion extending into the inlet port of the housing, and a disk portion extending radially outward from the stem portion; and
wherein the stop portion is defined by an end face of the inlet port, and the elastically deformable element is disposed between the end face of the inlet portion and an inner radial portion of the disk portion.

3. An actuator comprising:
a housing defining an inlet port;
a piston disposed within the housing;
a return spring disposed within the housing and configured to apply a first biasing force to the piston to move the piston toward a spring return position; and
an elastically deformable element;
wherein a first fluid pressure applied to the inlet port moves the piston against the first biasing force of the return spring, without compression of the elastically deformable element, to a first actuated position in which the piston indirectly engages a stop portion of the housing through at least the elastically deformable element; and
wherein a second fluid pressure, greater than the first fluid pressure, applied to the inlet port moves the piston against a second biasing force of the elastically deformable element to compress the elastically deformable element and to move the piston to a second actuated position beyond the first actuated position;
wherein the elastically deformable element has a spring rate at least about 10 times a spring rate of the return spring; and
wherein movement of the piston from the spring return position to the first actuated position comprises axial movement of the piston of a first distance, and movement of the piston from the first actuated position to the second actuated position comprises axial movement of the piston of a second distance less than about 20% of the first distance.

4. The actuator of claim 3, wherein the elastically deformable element comprises at least one Belleville spring washer.

5. The actuator of claim 3, wherein the elastically deformable element has a spring rate up to about 100 times a spring rate of the return spring.

6. The actuator of claim 3, wherein the second fluid pressure is up to about two times the first fluid pressure.

7. The actuator of claim 3, wherein the elastically deformable element has a spring rate that provides for proportional incremental movement of the piston between the first actuated position and the second actuated position in response to incremental increases in fluid pressure between the first fluid pressure and the second fluid pressure.

8. The actuator of claim 3, wherein the piston comprises a stem portion extending into the inlet port of the housing, and a disk portion extending radially outward from the stem portion.

9. The actuator of claim 3, wherein the piston is a first piston, and wherein the actuator further comprises a second piston disposed within the housing, wherein the first fluid pressure applied to the inlet port moves the second piston against the first biasing force of the return spring to a first actuated position of the second piston.

10. The actuator of claim 3, wherein the piston comprises an output shaft extending through an output port in the housing to apply an output force to a valve when the valve is assembled with the actuator.

11. The actuator of claim 3, wherein the elastically deformable element is disposed between the piston and the stop portion of the housing.

12. The actuator of claim 3, wherein the elastically deformable element is integral with the piston.

13. The actuator of claim 3, wherein the elastically deformable element is integral with the stop portion of the housing.

14. An actuated valve assembly comprising:
a valve including a valve body defining a flow path and a valve element axially movable to selectively control fluid flow through the valve flow path;
the actuator of claim 1, wherein the actuator is assembled with the valve and the piston is operatively connected with the valve element for axial movement of the valve element.

15. The actuated valve assembly of claim 14, wherein when the actuator is in the spring return position the valve element is in a closed position against a valve seat in the valve body.

16. The actuated valve assembly of claim 14, wherein when the actuator is in the first actuated position, the valve element is in a partial flow position.

17. The actuated valve assembly of claim 16, wherein when the actuator is in the second actuated position, the valve element is in a full flow position having a full flow coefficient greater than a partial flow coefficient in the partial flow position.

18. The actuated valve assembly of claim 17, wherein the full flow coefficient is up to about 10% greater than the partial flow coefficient.

19. An actuator comprising:
- a housing defining an inlet port;
- a piston disposed within the housing;
- a return spring disposed within the housing and configured to apply a first biasing force to the piston to move the piston toward a spring return position; and
- an elastically deformable element;
- wherein a first fluid pressure applied to the inlet port moves the piston against the first biasing force of the return spring to a first actuated position in which the piston indirectly engages a stop portion of the housing through at least the elastically deformable element; and
- wherein a second fluid pressure, greater than the first fluid pressure, applied to the inlet port moves the piston against a second biasing force of the elastically deformable element to compress the elastically deformable element and to move the piston to a second actuated position beyond the first actuated position;
- wherein the piston is a first piston, and wherein the actuator further comprises a second piston disposed within the housing, wherein the first fluid pressure applied to the inlet port moves the second piston against the first biasing force of the return spring to a first actuated position of the second piston; and
- wherein the stop portion is defined by an end face of the inlet port, and the elastically deformable element is disposed between the first piston and the second piston.

20. An actuator comprising:
- a housing defining an inlet port;
- a piston disposed within the housing;
- a return spring disposed within the housing and configured to apply a first biasing force to the piston to move the piston toward a spring return position; and
- an elastically deformable element;
- wherein a first fluid pressure applied to the inlet port moves the piston against the first biasing force of the return spring to a first actuated position in which the piston indirectly engages a stop portion of the housing through at least the elastically deformable element; and
- wherein a second fluid pressure, greater than the first fluid pressure, applied to the inlet port moves the piston against a second biasing force of the elastically deformable element to compress the elastically deformable element and to move the piston to a second actuated position beyond the first actuated position;
- wherein the piston is a first piston, and wherein the actuator further comprises a second piston disposed within the housing, wherein the first fluid pressure applied to the inlet port moves the second piston against the first biasing force of the return spring to a first actuated position of the second piston; and
- wherein the housing includes a partition plate disposed between the first piston and the second piston, wherein the stop portion is defined by the partition plate, and the elastically deformable element is disposed between the first piston and the partition plate.

21. An actuator comprising:
- a housing defining an inlet port;
- a piston disposed within the housing;
- a return spring disposed within the housing and configured to apply a first biasing force to the piston to move the piston toward a spring return position; and
- an elastically deformable element;
- wherein a first fluid pressure applied to the inlet port moves the piston against the first biasing force of the return spring to a first actuated position in which the piston indirectly engages a stop portion of the housing through at least the elastically deformable element; and
- wherein a second fluid pressure, greater than the first fluid pressure, applied to the inlet port moves the piston against a second biasing force of the elastically deformable element to compress the elastically deformable element and to move the piston to a second actuated position beyond the first actuated position;
- wherein the piston comprises an output shaft extending through an output port in the housing and outward of the housing, with an external portion of the output shaft being configured to apply an output force to a valve when the valve is assembled with the actuator;
- wherein the stop portion is defined by an exterior surface of the actuator housing surrounding the output port, and the elastically deformable element is disposed between the external portion of the output shaft and the output port exterior surface of the actuator housing.

22. The actuator of claim 21, wherein the elastically deformable element has a spring rate at least about 10 times a spring rate of the return spring.

23. The actuator of claim 21, wherein movement of the piston from the spring return position to the first actuated position comprises axial movement of the piston of a first distance, and movement of the piston from the first actuated position to the second actuated position comprises axial movement of the piston of a second distance less than about 20% of the first distance.

* * * * *